Patented May 29, 1945

2,377,172

UNITED STATES PATENT OFFICE 2,377,172

COLOR PASTE COMPOSITION

Timothy F. Murphy, Buffalo, N. Y., assignor to Allied Chemical & Dye Corporation, a corporation of New York No Drawing. Application October 7, 1941, Serial No. 413,974

16 Claims. (Cl. 106—22)

This invention relates to concentrated color pastes or suspensions used for the manufacture of duplicating papers, typewriter ribbons, stencil sheets, crayons, hectograph inks, and the like. It relates more particularly to improved compositions for use as such concentrated color pastes.

The concentrated color pastes or suspensions used for the above purposes are required to be of a smooth and fluid consistency notwithstanding that they are heavy pastes. They are generally prepared by dispersing in oily vehicles basic dyestuffs and/or pigments which are insoluble in said oily vehicles (i. e., oils, fats or fatty acids), especially non-drying oils,—such as, mineral oil (white oil), red oil, sesame oil, castor oil, petrolatum, and the like.

The consistency of an oil color paste depends upon many factors; for example, upon the oil absorption, porosity, grading, specific gravity, shape, and size of the pigment or color particles; viscosity of the oil vehicle; and surface tension relationship of the coloring matter in the vehicle. Some of the aforesaid factors are relatively difficult to measure and still more difficult to evaluate. For the purposes of the present invention, an approximate index of the consistency of heavy pastes is given by the ratio of the "apparent packed volume" of the coloring matter to the volume of the oil vehicle which is mixed therewith for the preparation of a color paste. The term "apparent packed volume" of a given quantity of a dry coloring matter as employed herein designates the observed volume occupied by the dry coloring matter (including the voids between the particles and, if the coloring matter is porous, the voids within the particles) when the coloring matter is packed or tamped according to the following standard procedure: A 20 gram sample of the dry coloring matter is dropped into a cylindrical glass graduate having a capacity of 100 cubic centimeters and an inside diameter of about 2.5 centimeters. The sample is packed or tamped by tapping the base of the graduate 50 times by hand against a horizontal wooden surface, the graduate being held vertically and tapped by successively raising the base of the graduate from 2 to 3 cm. above the wooden surface and bringing it down against the said surface with a slight jar. The final volume of the sample then observed is the "apparent packed volume" of the 20 gram sample of the coloring matter. By dividing the value determined as the "apparent packed volume" of the dry coloring matter by 20 (the weight in grams of the sample) the "apparent packed specific volume" of the coloring matter may be calculated, the reciprocal of which represents the "apparent packed density." Thus, from a simple test of a given coloring matter, the "apparent packed volume" of any amount of the dry coloring matter may be calculated; for example, by multiplying the weight of the dry coloring matter by its "apparent packed specific volume" or by dividing the weight of the dry pigment by its "apparent packed density."

The present invention is applied particularly to compositions of the above type in which the ratio of the "apparent packed volume" of the coloring matter to the volume of the oily vehicle (hereinafter designated as "color:oil volume ratio") is at least 0.8. For simplicity, compositions of the above type wherein the color:oil volume ratio is at least 0.8 are referred to herein as "heavy color pastes."

It is known that in preparing heavy color pastes of the above mentioned character the amount of coloring matter which can be incorporated in the vehicle is limited by the degree of smoothness and fluidity which are required as characteristics of said pastes. The necessary smoothness and fluidity vary somewhat, of course, depending on the particular use for which the color paste is intended. On the other hand, the productiveness of the aforesaid multigraphic inks or duplicating devices, in terms of the number of copies which can be made therewith, depends upon the concentration of the coloring matter in the color pastes from which such inks or devices are prepared. Thus, it is desirable that as much of the coloring matter as may be in keeping with the requirements as to smoothness and fluidity should be incorporated in such pastes.

According to the present invention, salts of certain hereindescribed esters of aliphatic carboxylic acids which contain, as a substituent in the carboxylic acid part of the molecule, a salt-forming radical of a polybasic oxygen-containing mineral acid, and which are soluble to a material extent in the oily vehicles of the color paste compositions, are incorporated into heavy color paste compositions whereby improved heavy color paste compositions (that is to say, dyestuff and/or pigment pastes or suspensions of the said character) are produced for use in the manufacture of hectograph inks, duplicating papers, typewriter ribbons, stencil sheets, etc.

I have found that the unexpected and distinctive effects of increasing the fluidity and of improving the smoothness of such heavy color paste compositions can be obtained by incorporating a small amount of one or more of such ester salts into such pastes; for example, by adding the ester salt to the heavy pastes or to the oily vehicles with which such pastes are prepared. Conversely, I have found that the inclusion of a small amount of one or a mixture of such ester salts, in solution in the vehicle of a heavy color paste composition of the character hereinbefore described, enables a paste of a specified smoothness and fluidity to be prepared with a greater content of dispersed dyestuff and/or pigment than has heretofore been possible. Thus, I have found that the addition of one or more of such ester salts to color pastes of said type (wherein the color:oil volume ratio is at least 0.8) produces a material improvement in the fluidity or smoothness of the pastes, or makes possible the incorporation of a considerable additional quantity of coloring matter without decreasing the fluidity of the paste.

The invention accordingly comprises the compositions having the properties, ingredients and proportions of ingredients exemplified in the compositions hereinafter disclosed. The scope of the invention will be indicated in the appended patent claims.

The ester salts which may be employed in accordance with the present invention are salts (preferably alkali metal salts and ammonium salts) of higher aliphatic esters of aliphatic carboxylic acids containing at least one salt-forming radical of a polybasic oxygen-containing mineral acid in the carboxylic acid part of the molecule. As used herein and in the claims, the term "higher aliphatic ester" denotes an ester in which an esterifying radical contains at least 10 carbon atoms. They are salts of esters in which one or more carboxyl groups of the carboxylic acids are esterified; i. e., carboxylic esters. Accordingly, where the term "ester" is used hereing and in the claims, it will be understood to refer to a carboxylic ester. They include, for example, salts of esters derived, on the one hand, from a higher aliphatic alcohol (containing at least 10 carbon atoms, particularly 10 to 18 carbon atoms in a carbon to carbon linkage) or an aliphatic partial ester of a polyhydric alcohol (which partial ester contains at least 10 carbon atoms and is preferably a higher fatty acid partial ester of a lower polyhydric alcohol) and, on the other hand, from a substituted aliphatic carboxylic acid (including mono- and poly-carboxylic acids) which contains, as at least one substituent, a salt-forming radical of a polybasic oxygen-containing mineral acid (for example, a sulfate radical, a sulfonic acid radical, a phosphate radical, a phosphinate radical: $-PO_2H_2$, or a phosphonate radical: $-PO_3H_2$, etc.). The alcohol residue (or esterified hydroxyl-bearing residue) of said esters may contain one or more substituents (for example, a limited number of hydroxyl groups), provided that the presence of such substituents does not render the ester salts insufficiently soluble, for the purposes of the present invention, in the oily vehicles of the color pastes into which the said ester salts are to be incorporated.

This class of esters, the salts of which are employed in accordance with the present invention, includes compounds represented by the general formula:

$$RZR'-OOC-R''-X$$
$$\phantom{RZR'-OOC-R''-}|$$
$$\phantom{RZR'-OOC-R''-}Y$$

in which R″ is the hydrocarbon residue of an aliphatic carboxylic acid; X is a salt-forming radical of a polybasic oxygen-containing mineral acid (for example, $-SO_3H$, $-OSO_3H$, $-OPO_3H_2$, $-PO_3H_2$, $-PO_2H_2$); Y is hydrogen, halogen, a mercapto group, or a carboxyl group; and RZR′ is an aliphatic radical containing at least 10 carbon atoms, in which R and R′ are aliphatic radicals and Z is a hydrocarbon radical or $-COO-$.

For efficient utility in accordance with the present invention the ester salts should be oil-soluble, i. e. substantially soluble in the oily vehicle, the solubility of the ester salt being such as to provide at least an amount of ester salt, in solution in the amount of oily vehicle employed corresponding with the minimum amount disclosed herein for satisfactory operation (one-half part of ester salt per 100 parts by weight of oily vehicle). The term "oil-soluble" is employed in this sense in the appended claims.

The following ester salts exemplify compounds which are well suited for making the compositions of this invention:

Sodium decyl sulfo-acetate_____ $C_{10}H_{21}-OOC-CH_2-SO_3Na$
Sodium lauryl sulfo-acetate_____ $C_{12}H_{25}-OOC-CH_2-SO_3Na$
Ammonium lauryl sulfo-butyrate__ $C_{12}H_{25}-OOC-C_3H_7-SO_3NH_4$

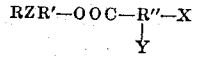

Sodium mono-lauryl ricinoleate sulfate_____ $C_{12}H_{25}-OOC-C_{17}H_{34}-OSO_3Na$ Turkey red oil (which contains as one of its major constituents an ammonium or sodium salt of glycerine di-ricinoleate monosulfate; e. g., $(HO-C_{17}H_{32}-COO-C_3H_5(OH)-OOC-C_{17}H_{34}-OSO_3Na)$ Other ester salts, adapted for incorporation in the color pastes of the present invention, may be exemplified by the ester-salt compositions which are obtained as products of the reaction of monoalkyl maleates of the alkyl carbon content above set out with sodium thiosulfate in aqueous solution, whereby the sodium thiosulfate probably is added to the maleic acid residue at the double bond, and which are believed to be sodium alkyl mercapto sulfo-succinates. Examples of such ester salts are the product of the reaction of sodium thiosulfate in aqueous solution with mono-cetyl maleate to form an ester salt which is probably sodium mono-cetyl mercapto sulfo-succinate; and the mixture of ester salts which are believed to be sodium mono-alkyl mercapto sulfo-succinates and which may be made by a similar process from the mixture of mono-alkyl maleates that is obtained by esterifying maleic acid with the mixture of alcohols resulting from the reduction of the fatty acids obtained by saponification of coconut fat.

Ester salts of another class which are adapted for incorporation in the color pastes of this invention, and which are believed to be sodium mono-alkyl chlor phosphinico-succinates, may be obtained by reacting phosphorus trichloride with a mono-alkyl maleate of th alkyl carbon content above set out or with a mixture of such esters, and neutralizing the resulting reaction product with aqueous caustic soda. In these reactions the phosphorus trichloride is probably added to the maleic acid residue at the double bond as Cl and $PCl_2$, and the $PCl_2$ radical is then hydrolyzed to a phosphinico group. Thus, mono-cetyl maleate may be treated with phosphorus trichloride, and then with aqueous caustic soda to produce sodium mono-cetyl chlor phosphinico-succinate; and the mixture of monoalkyl maleates made from the alcohol mixture derived by reduction of the fatty acids obtained from coconut oil may be treated similarly to produce a mixture which comprises chiefly sodium mono-lauryl chlor phosphinico-succinates.

The amount of ester salt which has been found necessary for the purpose of this invention varies according to the type of vehicle and the nature of the coloring matter; but as a general rule only a small amount of ester salt is required, usually not more than two and one-half parts per 100 parts by weight of vehicle. In most cases an amount varying from about one-half to two and one-half parts of ester salt per 100 parts of oil or fat is employed. A larger amount than necessary may be used but is without additional benefit.

The following examples, in which the parts are by weight, illustrate but do not limit the invention. Where an ingredient is used in more than one example, its composition is the same in all cases unless otherwise indicated. The "apparent packed density" as hereinbefore defined, in terms of grams per cubic centimeter, is indicated in parentheses after the name of the coloring matter in each of the examples; the specific gravity of the oil vehicle is similarly indicated; and the ratio of the "apparent packed volume" of the coloring matter to the volume of oily vehicle (the color:oil volume ratio) is given. In each case, the paste obtained was much thinner and smoother, its greater fluidity and uniformity were distinct and clearly evident, as compared with a paste which did not contain the ester salt but otherwise was of the same composition and had the same color:oil volume ratio. Thus, of two pastes made with the same dyestuff or pigment and oil or fat, the paste which contains the salt of an alkyl ester of a sulfo-, sulfato-, or phosphinico-aliphatic carboxylic acid of the class herein disclosed easily accommodates an increased amount of dispersed dyestuff and/or pigment without appreciable loss of fluidity or uniformity. The increase is about one-tenth to about one-fourth of the dyestuff and/or pigment content of the paste composition which does not contain the ester salt. This increased dyestuff and/or pigment content produces a much improved ink for use in duplicating papers, typewriter ribbons, stencil sheets, crayons, hectograph inks, and the like, as is shown by the much improved quality of the reproductions obtainable from duplicating papers, etc. when prepared from these improved color pastes.

*Example 1*

One part of sodium lauryl sulfo-acetate

($C_{12}H_{25}$—OOC—$CH_2$—$SO_3Na$)

was added to 200 parts of heavy white oil (U. S. P.; specific gravity 0.86) and dissolved by gently stirring and warming the mixture. Then 360 parts of Crystal Violet 6B Superfine: Color Index No. 681 (0.53) were stirred into the oily solution until a homogeneous smooth paste resulted (color:oil volume ratio=2.92).

In a similar manner, the compositions of the following examples were prepared.

*Example 2*

| | Parts |
|---|---|
| Sodium lauryl sulfo-acetate prepared from a mixture of alcohols which contain substantially from 10 to 18 carbon atoms and which are obtained by reduction of the fatty acids resulting from the saponification of coconut oil | 3 |
| Red oil (commercial oleic acid—specific gravity 0.89) | 125 |
| Methylene Blue 2B: C. I. No. 922 (0.77) | 250 |

Color:oil volume ratio=2.31.

*Example 3*

| | Parts |
|---|---|
| Sodium lauryl sulfo-acetate | 1 |
| Red oil | 100 |
| Crystal Violet 6B Superfine (0.53) | 250 |

Color:oil volume ratio=4.2.

*Example 4*

| | Parts |
|---|---|
| Sodium lauryl sulfo-acetate | 1 |
| Heavy white oil | 150 |
| Methylene Blue 2B (0.77) | 250 |

Color:oil volume ratio=2.31.

*Example 5*

| | Parts |
|---|---|
| Sodium cetyl sulfo-acetate | 1 |
| Heavy white oil | 125 |
| Crystal Violet 6B Superfine (0.53) | 225 |

Color:oil volume ratio=2.92.

*Example 6*

| | Parts |
|---|---|
| Sodium lauryl sulfo-acetate | 1 |
| Heavy white oil | 60 |
| Methylene Blue SP: C. I. No. 922 (0.77) | 90 |

Color:oil volume ratio=1.67.

*Example 7*

| | Parts |
|---|---|
| Sodium mono-lauryl sulfo-succinate | 1 |
| Heavy white oil | 40 |
| Crystal Violet 6B Superfine (0.53) | 72 |

Color:oil volume ratio=2.92.

*Example 8*

| | Parts |
|---|---|
| Turkey red oil | 0.8 |
| Heavy white oil | 100 |
| Crystal Violet 6B Superfine (0.53) | 180 |

Color:oil volume ratio=2.92.

*Example 9*

One part of sodium mono-cetyl mercapto sulfo-succinate which has the probable formula:

$$C_{16}H_{33}-OOC-C_2H_2{\begin{matrix}-COONa\\-SH\\-SO_3Na\end{matrix}}$$

was added to 150 parts of heavy white oil and dissolved by gently stirring and warming the mixture. Then 50 parts of Pigment Fast Yellow RP (0.23) were stirred into the oily solution until a homogeneous smooth paste resulted. (Color:oil volume ratio=1.25.)

In a similar manner, the compositions of the following examples were prepared.

*Example 10*

| | Parts |
|---|---|
| Sodium glycol oleate sulfo-succinate | 1 |
| Heavy white oil | 100 |
| Fast Pigment Blue GP (1.00) | 100 |

Color:oil volume ratio=0.86.

*Example 11*

| | Parts |
|---|---|
| Sodium decyl sulfo-acetate | 1 |
| Heavy white oil | 100 |
| Fast Pigment Violet RP (0.71) | 100 |

Color:oil volume ratio=1.21.

*Example 12*

| | Parts |
|---|---|
| Sodium mono-lauryl chlor phosphinico-succinate | 1 |
| Heavy white oil | 75 |
| Lake Rubine R Calcium Lake: C. I. No. 163 (0.30) | 50 |

Color:oil volume ratio=1.91.

Example 13

| | Parts |
|---|---|
| Sodium lauryl sulfo-butyrate | 1 |
| Heavy white oil | 75 |
| Fast Pigment Blue RP New (1.11) | 100 |

Color:oil volume ratio=1.03.

Example 14

| | Parts |
|---|---|
| Sodium mono-cetyl chlor phosphinico-succinate | 3 |
| Heavy white oil | 100 |
| American Vermillion: C. I. No. 1279 (1.82) | 400 |

Color:oil volume ratio=1.89.

Example 15

| | Parts |
|---|---|
| Sodium mono-cetyl chlor phosphinico-succinate | 1 |
| Heavy white oil | 100 |
| Sienna: C. I. No. 1267 (0.83) | 100 |

Color:oil volume ratio=1.04.

Example 16

| | Parts |
|---|---|
| Sodium mono-cetyl chlor phosphinico-succinate | 1 |
| Heavy white oil | 100 |
| Burnt Umber: C. I. No. 1305 (0.66) | 100 |

Color:oil volume ratio=1.30.

Example 17

| | Parts |
|---|---|
| Sodium mono-cetyl mercapto sulfo-succinate | 3 |
| Heavy white oil | 300 |
| Chrome Yellow Dark: C. I. No. 1270 (1.11) | 400 |

Color:oil volume ratio=1.03.

Example 18

| | Parts |
|---|---|
| Sodium mono-lauryl mercapto sulfo-succinate | 1 |
| Heavy white oil | 100 |
| Chrome Yellow Light: C. I. No. 1270 (0.77) | 100 |

Color:oil volume ratio=1.12.

Example 19

| | Parts |
|---|---|
| Sodium mono-cetyl mercapto sulfo-succinate | 0.7 |
| Heavy white oil | 100 |
| Pigment Fast Yellow RP (0.23) | 55 |

Color:oil volume ratio=2.06.

Example 20

| | Parts |
|---|---|
| Sodium mono-lauryl chlor phosphinico-succinate | 1.0 |
| Heavy white oil | 100 |
| Lake Rubine R Calcium Lake (0.30) | 75 |

Color:oil volume ratio=2.15.

In the foregoing examples any one, or a mixture, of the compounds disclosed or of other compounds of the general class noted above may be substituted, the one for the other, to produce similar excellent results. While salts of the alkyl esters of sulfato-, sulfo-, and/or phosphinico-aliphatic carboxylic acids of the above formula in which R" represents a propylene, a butylene, an amylene, or a higher alkylene radical may be employed in accordance with the present invention, the esters derived from aliphatic carboxylic acids in which R" contains a maximum of 17 carbon atoms, and especially the esters of ricinoleic acid sulfate, of sulfoacetic acid, of mercapto sulfo-succinic acid and of chlor phosphinico-succinic acid, represent particularly important classes of compounds for use in accordance with the present invention in view of their lower cost.

This invention is not limited to the use of the dyes and/or pigments of the examples. Thus, other basic dyes as well as other coloring materials which are insoluble or only slightly soluble in the vehicles employed in the making of duplicating papers, typewriter ribbons, stencil sheets and related compositions, and which are usable for the making of such compositions and/or which have been heretofore employed for the making of such compositions, may be employed in the making of the compositions of the present invention. The amount of dyestuff or pigment which is employed is varied, depending on the strength, fluidity and smoothness of paste required for the particular use. In all cases the ease with which the dyestuff or pigment disperses in the vehicle and the smoothness and fluidity of the resulting color pastes are much improved by the presence in the mixtures of the ester salts herein described.

The ester salts employed in the above examples were commercial products containing inorganic salts. Thus, the sodium lauryl sulfoacetate employed in Examples 1 to 7 contained, per 100 parts by weight, about 70 parts of a mixture of sodium alkyl sulfoacetates (in which "alkyl" was mainly lauryl) and about 30 parts of inorganic salts (mainly sodium chloride). Accordingly the amounts of pure ester salts present in the compositions of the examples were somewhat less than the amounts set out in the examples.

I claim:

1. A color paste composition comprising an oily vehicle having dissolved therein a small quantity of an oil-soluble salt of a higher aliphatic ester of an aliphatic carboxylic acid, said ester containing a salt-forming radical of a polybasic oxygen-containing mineral acid in the carboxylic acid part of the molecule, and coloring matter insoluble in said vehicle, in such proportions that the ratio of the "apparent packed volume" of the dry pulverized coloring matter to the volume of the oily vehicle is at least 0.8.

2. A color paste composition comprising an oily vehicle having dissolved therein a small quantity of an oil-solube salt of a higher aliphatic ester of a lower aliphatic carboxylic acid, said ester containing a salt-forming radical of a polybasic oxygen-containing mineral acid in the carboxylic acid part of the molecule, and coloring matter insoluble in said vehicle, in such proportions that the ratio of the "apparent packed volume" of the dry pulverized coloring matter to the volume of the oily vehicle is at least 0.8.

3. A color paste composition comprising an oily vehicle having dissolved therein a small quantity of an oil-soluble salt of a higher aliphatic ester of a lower aliphatic mono-carboxylic acid, said ester containing a salt-forming radical of a poly-basic oxygen-containing mineral acid in the carboxylic acid part of the molecule, and coloring matter insoluble in said vehicle, in such proportions that the ratio of the "apparent packed volume" of the dry pulverized coloring matter to the volume of the oily vehicle is at least 0.8.

4. A color paste composition comprising an oily vehicle having dissolved therein between one-half and two and one-half per cent of its weight of an oil-soluble salt of a higher aliphatic ester of an aliphatic carboxylic acid, said ester containing a salt-forming radical of a polybasic oxygen-containing mineral acid in the carboxylic acid part of the molecule and containing 10 to 18 carbon atoms in a carbon to carbon linkage in the remainder of the molecule, and coloring matter insoluble in said vehicle, in such proportions that the ratio of the "apparent packed volume" of the dry pulverized coloring matter to the volume of the oily vehicle is at least 0.8.

5. A color paste composition comprising an oily vehicle having dissolved therein a small quantity of an oil-soluble salt of a higher alkyl ester of a lower aliphatic carboxylic acid, said ester containing a salt-forming radical of a polybasic oxygen-containing mineral acid in the carboxylic acid part of the molecule and containing 10 to 18 carbon atoms in a carbon to carbon linkage in the higher alkyl group, and coloring matter insoluble in said vehicle, in such proportions that the ratio of the "apparent packed volume" of the dry pulverized coloring matter to the volume of the oily vehicle is at least 0.8.

6. A color paste composition comprising a non-drying oily vehicle having dissolved therein a small quantity of a salt selected from the group consisting of alkali metal and ammonium salts of a higher aliphatic ester of an aliphatic carboxylic acid, said ester containing a member of the group consisting of sulfonate, sulfate, and phosphinate radicals in the carboxylic acid part of the molecule, and coloring matter insoluble in said vehicle, in such proportions that the ratio of the "apparent packed volume" of the dry pulverized coloring matter to the volume of the oily vehicle is at least 0.8.

7. A color paste composition comprising a non-drying oily vehicle having dissolved therein a small quantity of an oil-soluble salt of a higher aliphatic ester of a lower sulfo aliphatic carboxylic acid containing at least 10 carbon atoms in the higher aliphatic group, and coloring matter insoluble in said vehicle, in such proportions that the ratio of the "apparent packed volume" of the dry pulverized coloring matter to the volume of the oily vehicle is at least 0.8.

8. A color paste composition comprising a non-drying oily vehicle having dissolved therein a small quantity of an oil-soluble salt of a higher alkyl ester of a lower sulfo-aliphatic carboxylic acid containing 10 to 18 carbon atoms in the higher alkyl group, and coloring mater insoluble in said vehicle, in such proportions that the ratio of the "apparent packed volume" of the dry pulverized coloring matter to the volume of he oily vehicle is at least 0.8

9. A color paste composition comprising a non-drying oily vehicle having dissolved therein the sodium salt of a higher alkyl sulfoacetate containing 10 to 18 carbon atoms in the higher alkyl group, and coloring matter insoluble in said vehicle, in such proportions that the ratio of the "apparent packed volume" of the dry pulverized coloring matter to the volume of the oily vehicle is at least 0.8.

10. A color paste composition for use in the manufacture of duplicating papers, typewriter ribbons, stencil sheets, crayons, hectograph inks and the like, comprising a suspension of a basic dyestuff in an oily vehicle having dissolved therein a small quantity of an oil-soluble salt of a higher aliphatic ester of an aliphatic carboxylic acid, said ester containing a salt-forming radical of a polybasic oxygen-containing mineral acid in the carboxylic acid part of the molecule and containing at least 10 carbon atoms in a carbon to carbon linkage in the remainder of the molecule, the amounts of basic dyestuff and oily vehicle being such that the ratio of the "apparent packed volume" of the dry pulverized basic dyestuff to the volume of oily vehicle is at least 0.8.

11. A color paste composition for use in the manufacture of duplicating papers, typewriter ribbons, stencil sheets, crayons, hectograph inks and the like, comprising a suspension of a basic dyestuff in a non-drying oily vehicle having dissolved therein a small quantity of a salt selected from the group consisting of alkali metal and ammonium salts of a higher aliphatic ester of an aliphatic carboxylic acid, said ester containing a member of the group consisting of the sulfonate, sulfate, and phosphinate radicals in the carboxylic acid part of the molecule, the amounts of basic dyestuff and oily vehicle being such that the ratio of the "apparent packed volume" of the dry pulverized basic dyestuff to the volume of oily vehicle is at least 0.8.

12. A color paste composition for use in the manufacture of duplicating papers, typewriter ribbons, stencil sheets, crayons, hectograph inks and the like, comprising a suspension of a basic dystuff in a non-drying oily vehicle having dissolved therein a small quantity of an alkali-metal salt of a higher aliphatic ester of a lower sulfo aliphatic carboxylic acid containing at least 10 carbon atoms in a carbon to carbon linkage in the higher aliphatic group, the amounts of basic dyestuff and oily vehicle being such that the ratio of the "apparent packed volume" of the dry pulverized basic dyestuff to the volume of oily vehicle is at least 0.8.

13. A color paste composition for use in the manufacture of duplicating papers, typewriter ribbons, stencil sheets, crayons, hectograph inks and the like, comprising a suspension of a basic dyestuff in a non-drying oily vehicle having dissolved therein a small quantity of an oil-soluble salt of a higher alkyl ester of a lower sulfo-aliphatic monocarboxylic acid containing 10 to 18 carbon atoms in the higher alkyl group, the amounts of basic dyestuff and oily vehicle being such that the ratio of the "apparent packed volume" of the dry pulverized basic dyestuff to the volume of oily vehicle is at least 0.8.

14. A color paste composition for use in the manufacture of duplicating papers, typewriter ribbons, stencil sheets, crayons, hectograph inks and the like, comprising a suspension of a basic dyestuff in a non-drying oily vehicle having dissolved therein a small amount of an oil-soluble salt of a higher alkyl sulfoacetate in which the higher alkyl group contains at least 10 carbon atoms, the amounts of basic dyestuff and oily vehicle being such that the ratio of the "apparent packed volume" of the dry pulverized basic dyestuff to the volume of oily vehicle is at least 0.8.

15. A color paste composition for use in the manufacture of duplicating papers, typewriter ribbons, stencil sheets, crayons, hectograph inks and the like, comprising a suspension of a basic dyestuff in a non-drying oily vehicle, the amounts of basic dyestuff and oily vehicle being such that the ratio of the "apparent packed volume" of the dry pulverized basic dyestuff to the volume of oily vehicle is at least 0.8 and between one-half and two and one-half per cent, based on the weight of the oil, of a sodium salt of a higher alkyl sulfoacetate containing 10 to 18 carbon atoms in the higher alkyl group.

16. A color paste composition for use in the manufacture of duplicating papers, typewriter ribbons, stencil sheets, crayons, hectograph inks and the like, comprising a suspension of a basic dyestuff in a non-drying oily vehicle, the amounts of basic dyestuff and oily vehicle being such that the ratio of the "apparent packed volume" of the dry pulverized basic dyestuff to the volume of oily vehicle is at least 0.8 and between one-half and two and one-half per cent of sodium lauryl sulfoacetate, based on the weight of the oil.

TIMOTHY F. MURPHY.